(12) United States Patent
Reichardt et al.

(10) Patent No.: US 10,059,359 B2
(45) Date of Patent: Aug. 28, 2018

(54) BUGGY

(71) Applicant: Bumbleride Inc., San Diego, CA (US)

(72) Inventors: Matthew Reichardt, San Diego, CA (US); Michael Downes, Coronado, CA (US); Chris Todter, San Diego, CA (US)

(73) Assignee: Bumbleride Inc., San Diego, CA (US)

( * ) Notice: Subject to any disclaimer, the term of this patent is extended or adjusted under 35 U.S.C. 154(b) by 133 days.

(21) Appl. No.: 15/000,058

(22) Filed: Jan. 19, 2016

(65) Prior Publication Data
US 2017/0072981 A1 Mar. 16, 2017

(30) Foreign Application Priority Data

Sep. 11, 2015 (DE) .................. 10 2015 115 396

(51) Int. Cl.
*B62B 7/06* (2006.01)
*B62B 7/08* (2006.01)

(52) U.S. Cl.
CPC ............ *B62B 7/062* (2013.01); *B62B 7/08* (2013.01); *B62B 2205/18* (2013.01); *B62B 2205/20* (2013.01); *B62B 2205/22* (2013.01)

(58) Field of Classification Search
CPC .. B62B 7/062; B62B 7/08; B62B 3/02; B62B 7/008
See application file for complete search history.

(56) References Cited

U.S. PATENT DOCUMENTS

| | | | | |
|---|---|---|---|---|
| 4,544,178 A * | 10/1985 | Al-Sheikh | ............... | B62B 7/062 280/642 |
| 8,226,110 B2 * | 7/2012 | Liao | ................ | B62B 7/062 280/47.38 |
| 8,276,935 B2 * | 10/2012 | Minato | ................ | B62B 7/062 280/47.38 |
| 8,517,412 B2 * | 8/2013 | Tsai | ................ | B62B 7/08 280/647 |
| 8,596,669 B2 * | 12/2013 | Liao | ................ | B62B 7/08 280/47.38 |
| 8,602,442 B2 * | 12/2013 | Li | ................ | B62B 7/062 280/642 |
| 8,696,015 B2 * | 4/2014 | Karremans | ............ | B62B 7/062 280/642 |
| 8,714,581 B2 * | 5/2014 | Fritz | ................ | B62B 7/08 280/642 |
| 8,899,613 B2 * | 12/2014 | Cheng | ................ | B62B 7/008 280/47.38 |

(Continued)

*Primary Examiner* — Hau Phan
(74) *Attorney, Agent, or Firm* — Michael Soderman

(57) ABSTRACT

The invention relates to a buggy comprising an upper sliding frame and a lower sliding frame to which the front wheels are attached. In the upright driving position of the buggy, viewed in the side view, the upper sliding frame and the lower sliding frame are approximately aligned with one another. There is also a rear frame to which the rear wheels are attached. In the driving position, the buggy, viewed from the side, is oriented at an angle to the sliding frames, and the buggy can be collapsed about joints from the driving position into a transport position. Joint units, to which the respective end of a strut of the upper sliding frame facing the joint units and the respective end of a strut of the rear frame facing the joint units, are attached so as to be pivotable about joint axes, which are parallel to one another.

6 Claims, 11 Drawing Sheets

(56) References Cited

U.S. PATENT DOCUMENTS

| | | | | |
|---|---|---|---|---|
| 8,985,616 | B1* | 3/2015 | Chen | B62B 7/062 |
| | | | | 280/47.38 |
| 8,998,241 | B1* | 4/2015 | Cheng | B62B 7/062 |
| | | | | 280/47.38 |
| 9,085,312 | B2* | 7/2015 | Liu | B62B 7/08 |
| 2009/0121455 | A1* | 5/2009 | Kretschmer | B62B 7/062 |
| | | | | 280/642 |
| 2013/0113185 | A1* | 5/2013 | Zehfuss | B62B 3/02 |
| | | | | 280/647 |
| 2014/0339793 | A1* | 11/2014 | Xu | B62B 7/08 |
| | | | | 280/650 |

* cited by examiner

BUGGY

CROSS REFERENCE TO RELATED APPLICATIONS

This application claims the benefits of German Application No. DE 10 2015 115 396.3 filed on Sep. 11, 2015; this application is incorporated by reference herein in its entirety.

BACKGROUND

The instant invention relates to a buggy or perambulator comprising an upper sliding frame, a lower sliding frame, to which the front wheels are attached, wherein, in the upright driving position of the buggy, viewed in the side view, upper sliding frame and lower sliding frame are approximately aligned with one another, as well as a rear frame, to which the rear wheels are attached, said buggy, in the driving position, viewed in the side view, is in each case oriented at an angle to the sliding frame, wherein the buggy can be collapsed about joints from the driving position into a transport position, in which upper sliding frame, lower sliding frame and rear frame, rest comparatively flat on top of one another.

Buggies or perambulators of the afore-mentioned type are known on principle from the prior art. WO 2005012738 A1, for example, describes such a buggy, wherein the chassis thereof is illustrated in FIG. 1. In the case of this known buggy, the three parts of the chassis, namely the upper sliding frame, the lower sliding frame and the rear frame, pivot about a single common joint axis, which extends in transverse direction of the chassis, upon collapsing. This requires that the approximately disk-shaped joint parts, which are connected to the individual frame parts of the chassis, are arranged downstream from one another, viewed in the direction of the joint axis.

On principle, the buggies of this type are collapsed in such a manner that, after releasing the joint lock, the upper sliding frame is pivoted backwards in the direction of the rear frame. This alternative has the disadvantage that the elements of the canopy, which consists of textile materials, or of the seat area, come into contact with the bottom in the collapsed position and can thus become dirty.

There are also buggies comprising an afore-mentioned basic design of the chassis, in the case of which the collapsing is carried out in such a manner that the upper sliding frame is pivoted forwards in the direction of the lower sliding frame. In this alternative, however, the user might jam his fingers between struts of the parts of the chassis, which move in the direction of one another, upon collapsing, so that injuries might occur.

SUMMARY

The instant invention relates to a buggy or perambulator comprising an upper sliding frame, a lower sliding frame, to which the front wheels (14) are attached, wherein, in the upright driving position of the buggy, viewed in the side view, upper sliding frame and lower sliding frame are approximately aligned with one another, as well as a rear frame, to which the rear wheels (16) are attached, said buggy, in the driving position, viewed in the side view, is in each case oriented at an angle to the sliding frames, wherein the buggy can be collapsed about joints from the driving position into a transport position, in which upper sliding frame, lower sliding frame and rear frame, rest comparatively flat on top of one another. According to the invention, provision is made for joint units (12), to which the respective end of a strut (11) of the upper sliding frame, which faces said joint units on the one hand, and the respective end of a strut of the rear frame (15), which faces said joint units on the other hand, are attached so as to be pivotable about joint axes, which are parallel to one another. Preferably, the end of the strut (11) of the upper sliding frame, which faces the joint unit (12), and the end of the strut (15) of the rear frame, which faces the joint unit (12), are connected to one another via gear means, such as toothed wheels, for example, in the area of the joint unit in such a manner that a pivot movement of the strut (15) of the rear frame results in opposite direction of rotation, in response to a pivot movement of the strut (11) of the upper sliding frame in a first direction of rotation.

DETAILED DESCRIPTION

It is the object of the instant invention to provide a buggy or perambulator comprising the features of the afore-mentioned species, which provides for a movement of the upper sliding frame in the direction of the lower sliding frame of the chassis upon collapsing, wherein the design in the joint area, however, is chosen in such a manner that injuries to the user are avoided upon collapsing.

A buggy or perambulator of the afore-mentioned species solves this object by means of the characterizing features of the main claim.

According to the invention, provision is made for joint units, to which the respective end of a strut of the upper sliding frame, which faces said joint units on the one hand, and the respective end of a strut of the rear frame, which faces said joint units on the other hand, are attached so as to be pivotable about joint axes, which are parallel to one another.

As a result of the solution according to the invention, it is possible to avoid injuries in the case of a design, in which the struts of the upper sliding frame move in the direction of the struts of the lower sliding frame upon collapsing. It is particularly advantageous thereby if, according to a preferred further development of the invention, provision is made on the joint units for a joint cover, which prevents a jamming of a body part of a user in the space between the struts, which move in the direction of one another, upon collapsing the buggy into the transport position, because the respective ends of the struts are spaced apart from one another on the user side in the joint vicinity.

According to a further development of the invention, it is furthermore proposed for the end of the strut of the upper sliding frame, which faces the joint unit, and for the end of the strut of the rear frame, which faces the joint unit, to be connected to one another via gear means in the area of the joint unit in such a manner that a pivot movement of the strut of the rear frame results in opposite direction of rotation in response to a pivot movement of the strut of the upper sliding frame in a first direction of rotation. In the case of this design alternative, it is sufficient for the user to pivot the strut of the upper sliding frame after releasing a lock, whereby the strut of the rear frame also pivots automatically and the chassis of the buggy is collapsed comfortably by using a single movement into the transport position so as to be flat.

Preferably, the end of the strut of the lower sliding frame, which faces the joint unit, is fixedly attached to the joint unit, so that the struts of the lower sliding frame, on which the front wheels are located, pivot with the joint units upon collapsing.

Provision is furthermore preferably made for at least a first toothed wheel as gear means, which rotates about the joint axis of the strut of the upper sliding frame, as well as for at least a second toothed wheel, which rotates about the axis of the strut of the rear frame, which is parallel thereto. Both gear wheels engage with one another and effect that the rear frame, on which the rear wheels are located, also pivots in the direction of the lower sliding frame in response to pivoting the upper sliding frame.

For unlocking the joint units, provision is furthermore preferably made for at least one component, in particular a hook, which makes it possible to unlock the joint units and thus to pivot the struts and to collapse the buggy into the flat transport position after releasing an engagement with locking elements. This design provides for a simple handling and for a quick collapsing of the buggy using only a few hand movements.

According to a preferred further development of the invention, the hook can be disengaged from the locking elements by means of at least one tie against a spring force, so that the hook can move back into the engaged position again after letting go of the tie.

Provision is preferably also made for pins or the like to be present on toothed wheel units as locking elements, which interact with catches and/or annular grooves as stop elements on at least one base plate of the joint unit. As a result of this, a fixing in the upright driving position can be effected on the one hand and a limitation of the pivot path in the flat transport position and a locking of the joint units can also be effected in this position by means of further locking elements, if applicable.

The features mentioned in the subclaims pertain to preferred further developments of the solution of the object according to the invention. Further advantages of the invention follow from the detailed description below.

BRIEF DESCRIPTION OF THE DRAWINGS

The instant invention will be specified in more detail below by means of exemplary embodiments with reference to the enclosed drawings.

DETAILED DESCRIPTION OF THE PREFERRED EMBODIMENT

Figure 1:
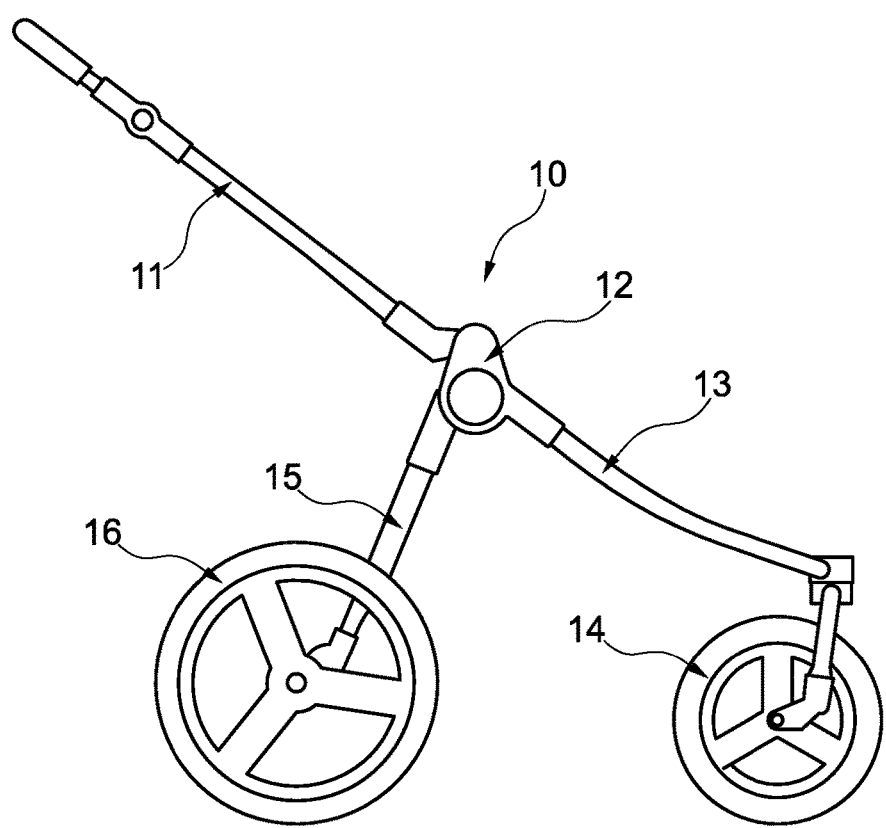
FIG. 1 shows a view of a buggy according to an exemplary alternative of the instant invention in the opened driving position.

Reference is initially made to FIG. 1. It shows the buggy according to the invention, which is identified with reference numeral 10, in a schematically simplified side view in the opened driving position. The chassis of the buggy comprises an upper sliding frame, which, viewed in the front view, is approximately U-shaped on principle, comprising an upper transverse connection, which cannot be seen here, and in each case furthermore has a strut 11, which extends downwards, which extends to the joint unit 12, on both sides in each case. On the other side of the joint unit 12, the chassis of the buggy continues in the lower sliding frame, the strut 13 of which runs approximately in an alignment with the strut 11 of the upper sliding frame, wherein this strut 13 can be fixedly connected to the joint unit 12. Such struts, which are parallel to one another, in turn, are present on both sides of the buggy. The front wheels 14 are mounted to the lower end of the struts 13 of the lower sliding frame. The struts 11 of the upper sliding frame are connected to the joint unit 12 in an articulated manner, namely about a horizontal axis, which extends in transverse direction of the buggy. With their upper end, struts 15 of the rear frame are in each case furthermore connected in an articulated manner to the joint unit 12. The rear wheels 16 of the buggy are mounted to the lower end of these struts 15 of the rear frame. In the driving position shown in FIG. 1, the struts 15 of the rear frame in each case extend at an angle to the struts 11 of the upper sliding frame and to the struts 13 of the lower sliding frame.

The collapsing of the buggy from the driving position shown in FIG. 1 into the flat collapsed transport position occurs in such a manner that the upper sliding frame is moved in the direction of the arrow in the direction of the lower sliding frame 13 and the strut 11 is thus moved in the direction of the strut 13 so as to pivot clockwise in the drawing. In contrast, the strut 15 of the rear frame pivots in the direction of the lower arrow in FIG. 1 in the direction of the strut 13 of the lower sliding frame 13 and thus pivots in opposite direction of rotation as the strut 11 of the upper sliding frame. The struts of the frame units of the chassis are connected to one another via gear means in the joint unit 12 in such a manner that an inevitable coupling to the pivot movement of the strut 15 of the rear frame results in response to the collapsing movement in response to pivoting the strut 11 of the upper sliding frame and that the strut 15 thus moves in the direction of the strut 13 of the lower sliding frame, until the collapsed transport position has been reached, in which the struts 11, 13, 15 are located virtually parallel to one another, so that the transport position is very flat.

Figure 2:
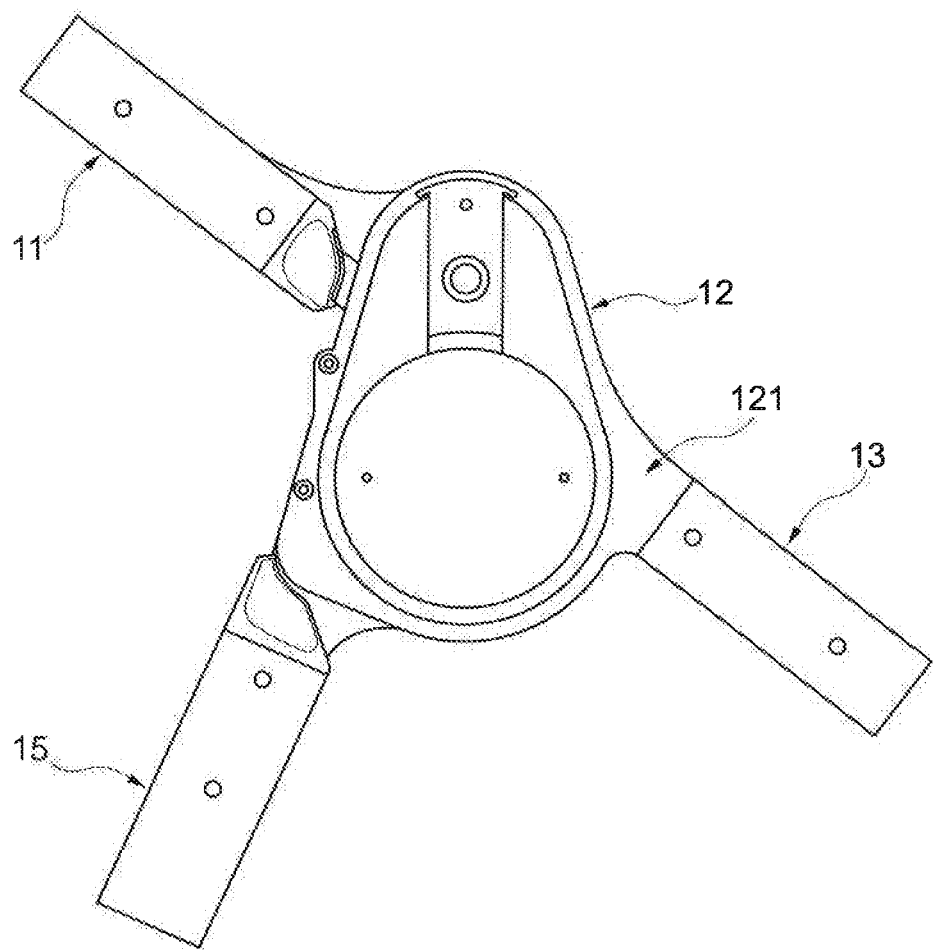
FIG. 2 shows an enlarged detailed view of a joint unit, which connects the struts of the chassis to one another in an articulated manner, in a position, which corresponds to the opened driving position according to FIG. 1.

The mode of operation and the setup of the joint unit 12 and the afore-mentioned gear means will be specified below in detail by means of the further drawings. FIG. 2 shows a schematic, enlarged side view of the joint unit 12, in which the strut 11 of the upper sliding frame, which branches off from said joint unit 12, the strut 15 of the rear frame, which branches off from said joint unit 12, and the strut 13 of the lower sliding frame, which branches off from the joint unit, can be seen. The joint unit has a joint cover 121, so that upon collapsing the buggy into the transport position does not result in the risk that the user jams his fingers in the space between the struts 11 and 13 or 15 and 13, respectively, which move in the direction of one another. It can be seen that the joint unit 12 prevents this, because the respective ends of the struts are spaced apart from one another on the user side in the joint vicinity.

Figure 3:
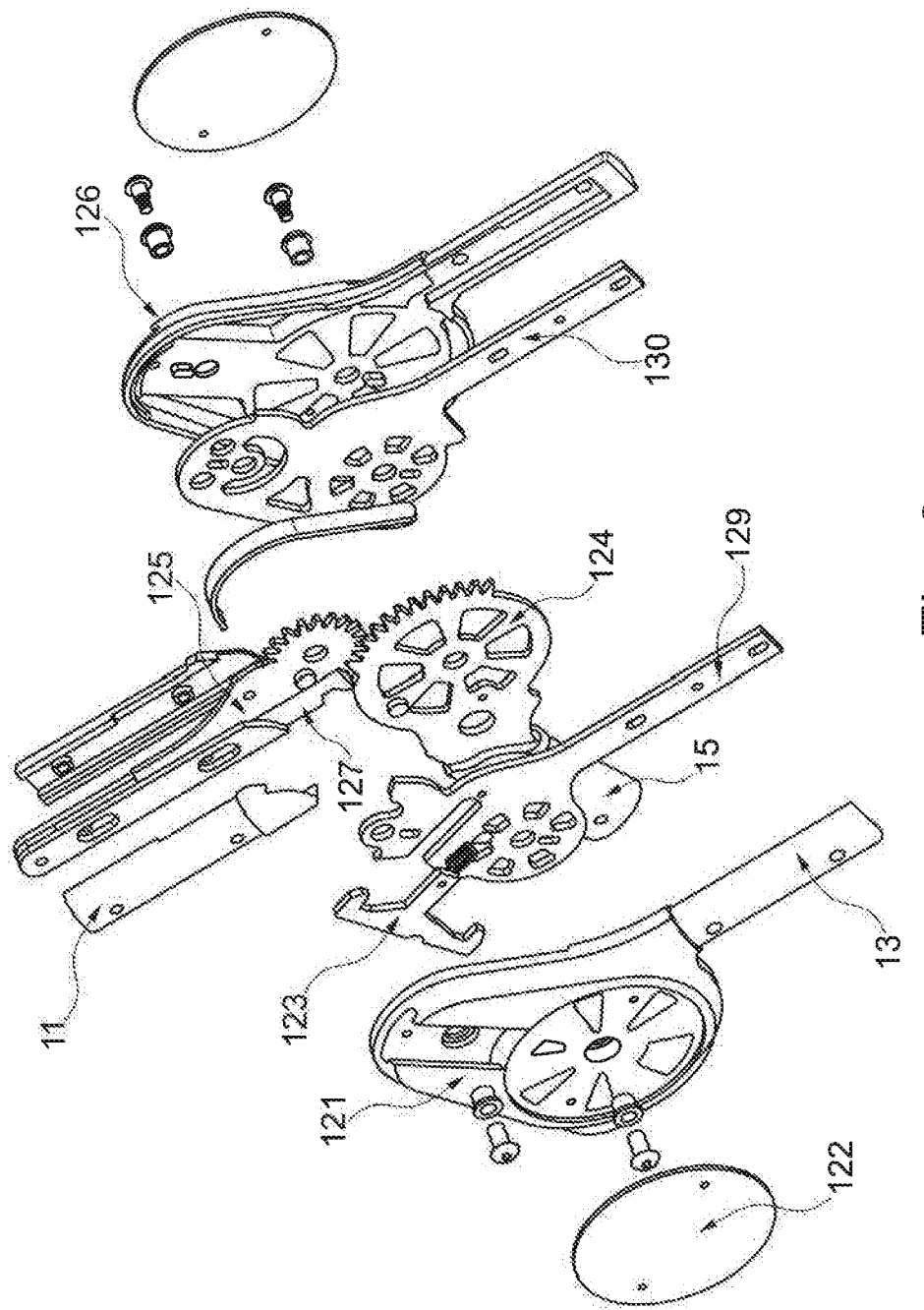
FIG. 3 shows an exploded illustration of the joint unit.

FIG. 3 shows an exploded view of a joint unit 12. It can be seen here that the strut 13 of the lower sliding frame, which leads to the front wheel, is arranged approximately radially/tangentially to the joint axis and is fixedly connected to the joint cover 121. On the visible side, the joint unit has a cover 122. Viewed in the direction of the joint axis, a hook 123, by means of which the joint can be unlocked when the buggy is to be collapsed, is located downstream from the joint cover 121. The unlocking can take place by pulling on the hook 123. For this purpose, a tie 127 is present, the function of which will be explained in more detail below. A toothed wheel part comprising a first larger toothed wheel 124, which rotates about the main axis of the joint, is connected to the strut 15 of the rear frame. Provision is furthermore made for a second toothed wheel part 125 comprising a smaller toothed wheel, which cogs with the first toothed wheel 124 and which thus rotates in the opposite direction of the first larger toothed wheel 124, so that it is attained in response to the pivot movement of the strut 11 of the upper sliding frame that the strut 15 of the rear frame pivots in the opposite direction of rotation and moves along. The joint unit furthermore comprises a smaller base plate 129, arranged between the joint cover 121 and the toothed wheel part 124, as well as a larger second base plate 130, which is arranged upstream of the second joint cover 126.

Figure 4:
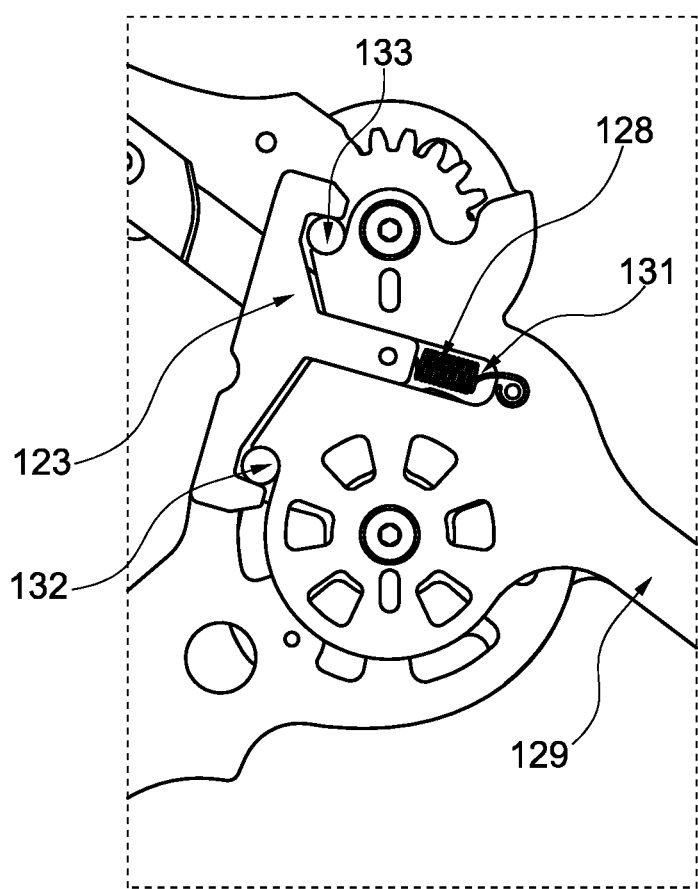
FIG. 4 shows an enlarged detailed view of the joint area, viewed from the right side.
Figure 5:
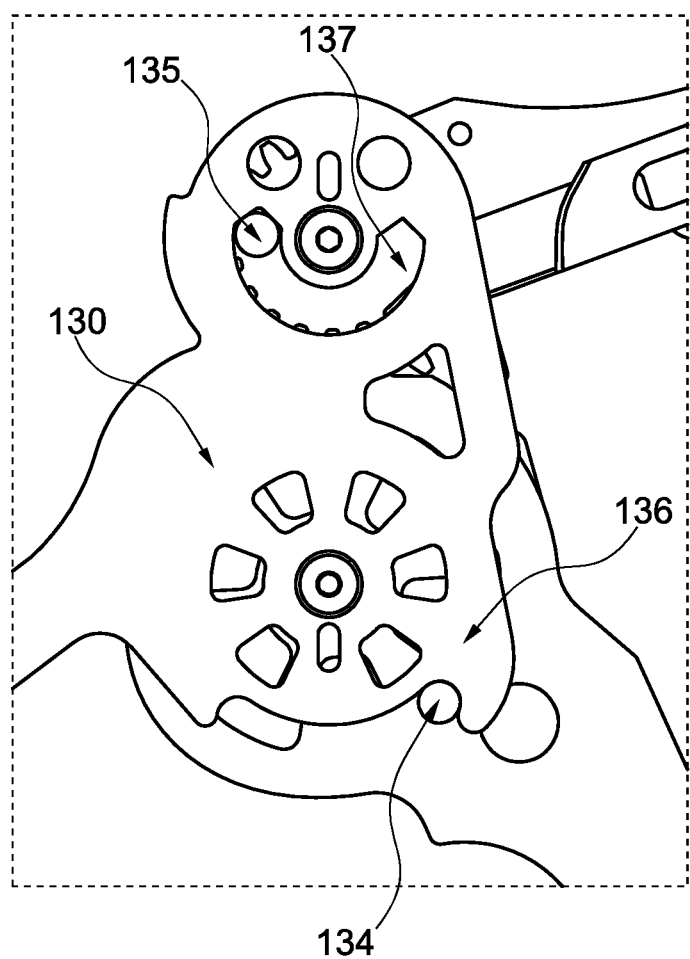
FIG. 5 shows a similar detailed view of the joint area, viewed from the left side.

Reference is made below to FIGS. 4 and 5. It can be seen therein that the hook 123 is connected to a spring 128 and engages with a recess 131 in the smaller base plate 129. Provision is furthermore made for a first locking pin 132 as well as for a second locking pin 133, each of which overlap angled ends of the hook 123, wherein the first locking pin 132 is located at the first toothed wheel unit 124 (see FIG. 3) and engages with a catch on the smaller base plate 129, while the second locking pin 133 is located at the second toothed wheel unit 125 and engages with a catch on the second larger base plate 130. Both toothed wheels can be locked in this manner via the locking pins 132, 133 by means of the hook 123 and the pivoting of all of the struts 11, 13 and 15 can thus be prevented.

FIG. 5 shows that secondary locking pins 134 (on the toothed wheel side 124) or 135 (on the smaller toothed wheel unit 125), respectively, can be located on the respective other side of the toothed wheel units, wherein the locking pin 134 engages below a catch 136 of the large base plate 130 and the locking pin 135 engages with an annular groove 137 of the large base plate 130.

Figure 6:
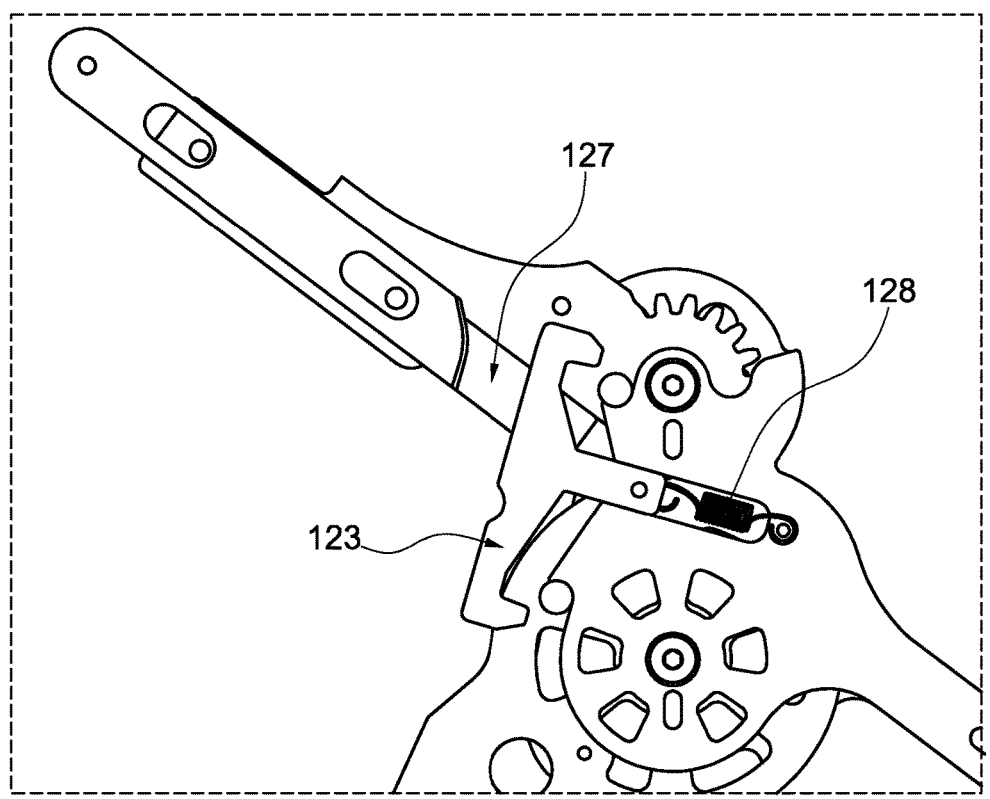
FIG. 6 shows a further detailed view, which explains the unlocking of the joint.
Figure 7:
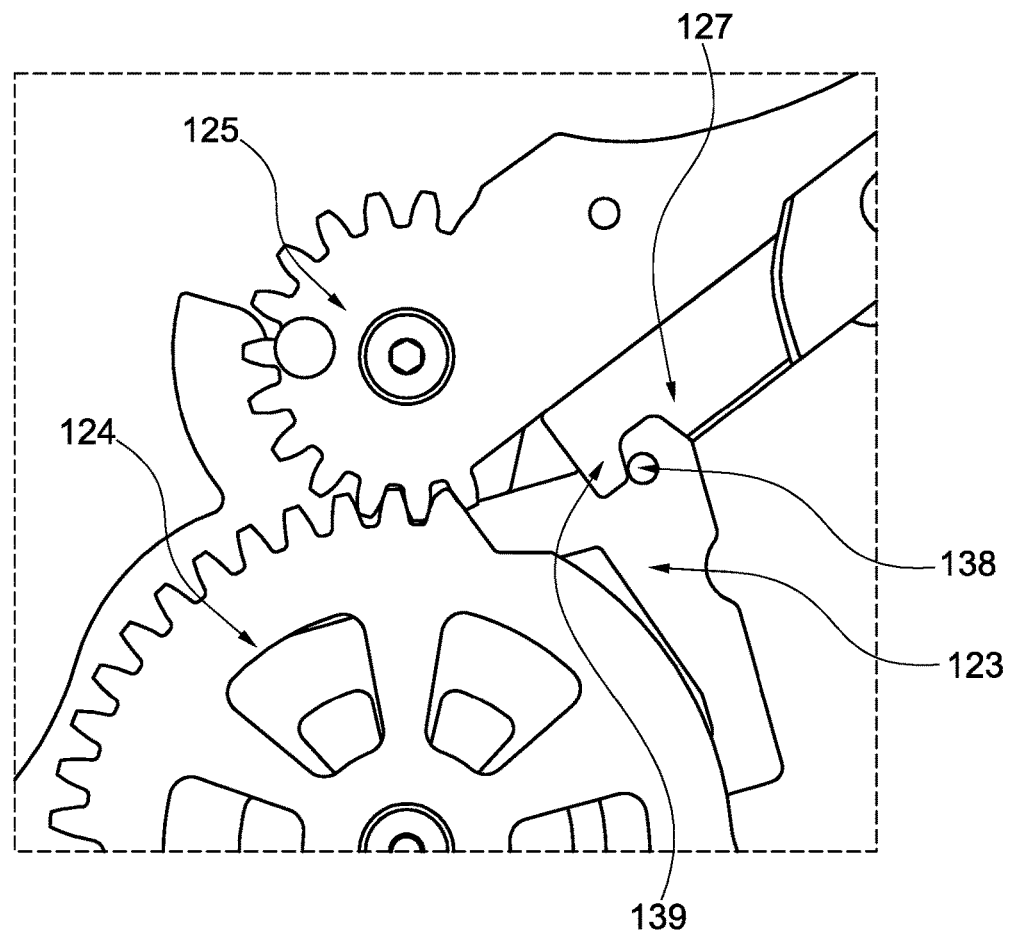
FIG. 7 shows a corresponding view as in FIG. 6, but viewed from the other side.

It can be seen in FIGS. 6 and 7 that the hook 123 can be pulled in the direction of the arrow against the force of the spring 128 by means of the tie 127, so as to release the engagement with the various locking pins. As can be seen from FIG. 7, the tie 127 engages with a nose 139 behind a pin 138 on the hook 123 for this purpose. After the hook 123 is pulled out, the base plates 129 and 130 of the joint can rotate freely. After passing the locking pins 132, 133, the spring 128 pulls the hook 123 back into the locked position (see FIG. 8). FIG. 9 shows the engagement of the two toothed wheels 124, 125, which illustrate the gear means of the joint unit.

Figure 8:
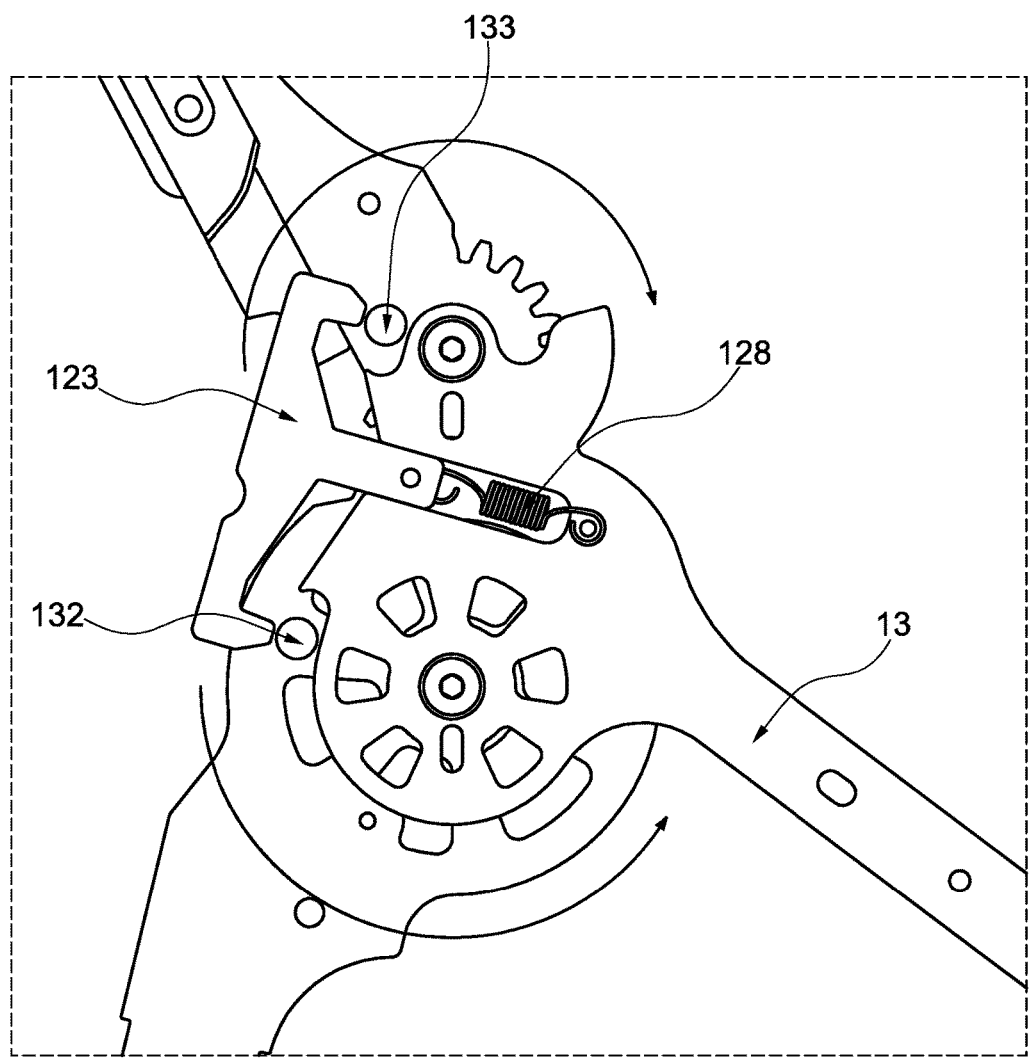
FIG. 8 shows a further detailed view of the joint area.
Figure 9:
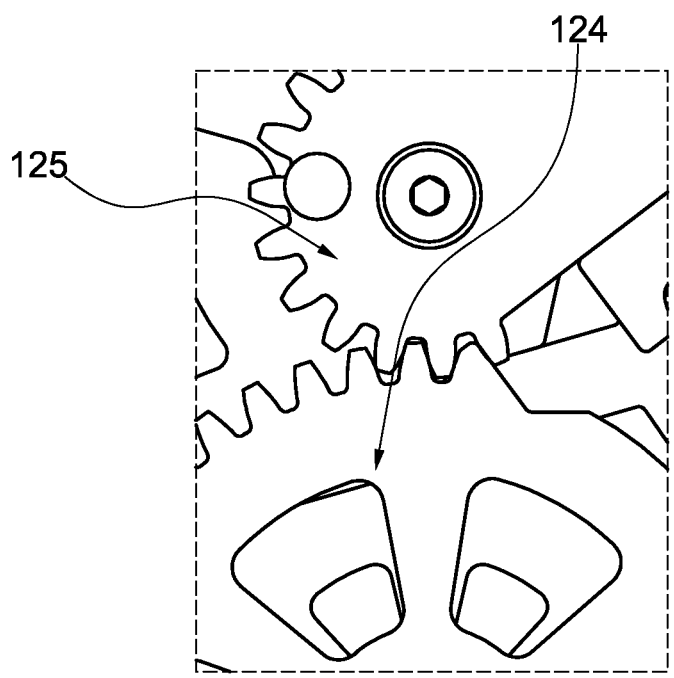
FIG. 9 shows a view, which shows a detail from FIG. 8.
Figure 10:
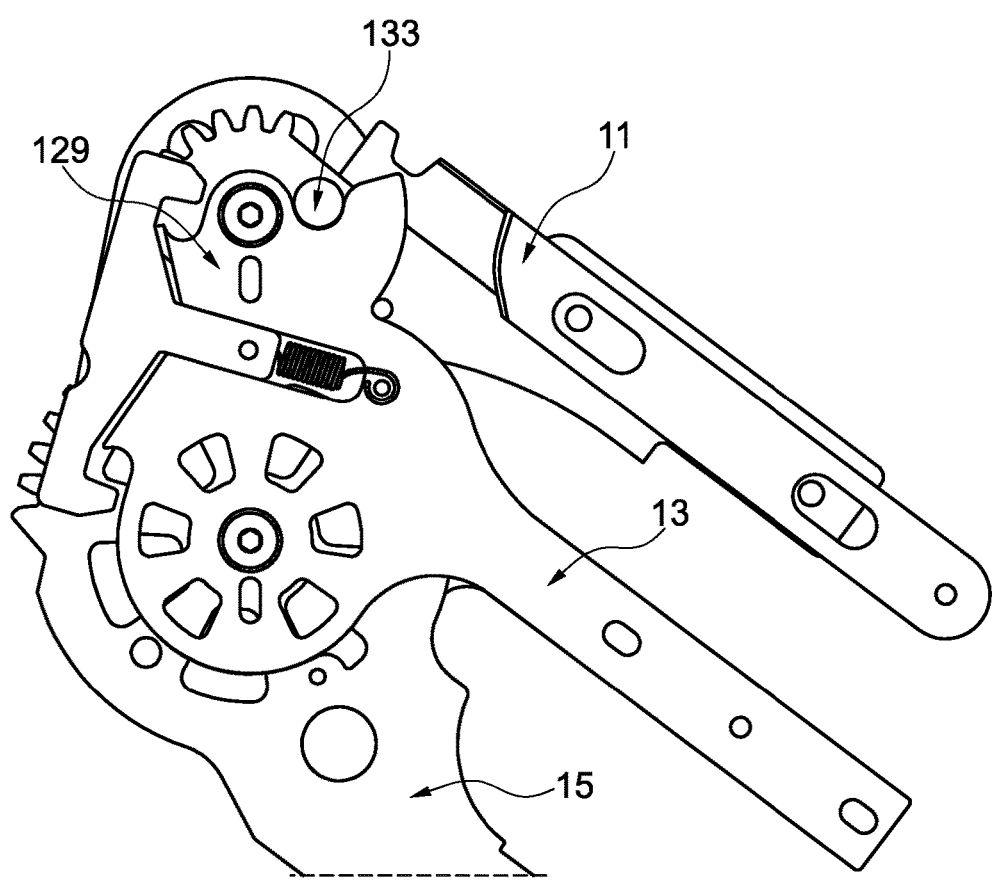
FIG. 10 shows a further lateral view of the joint area.
Figure 11:
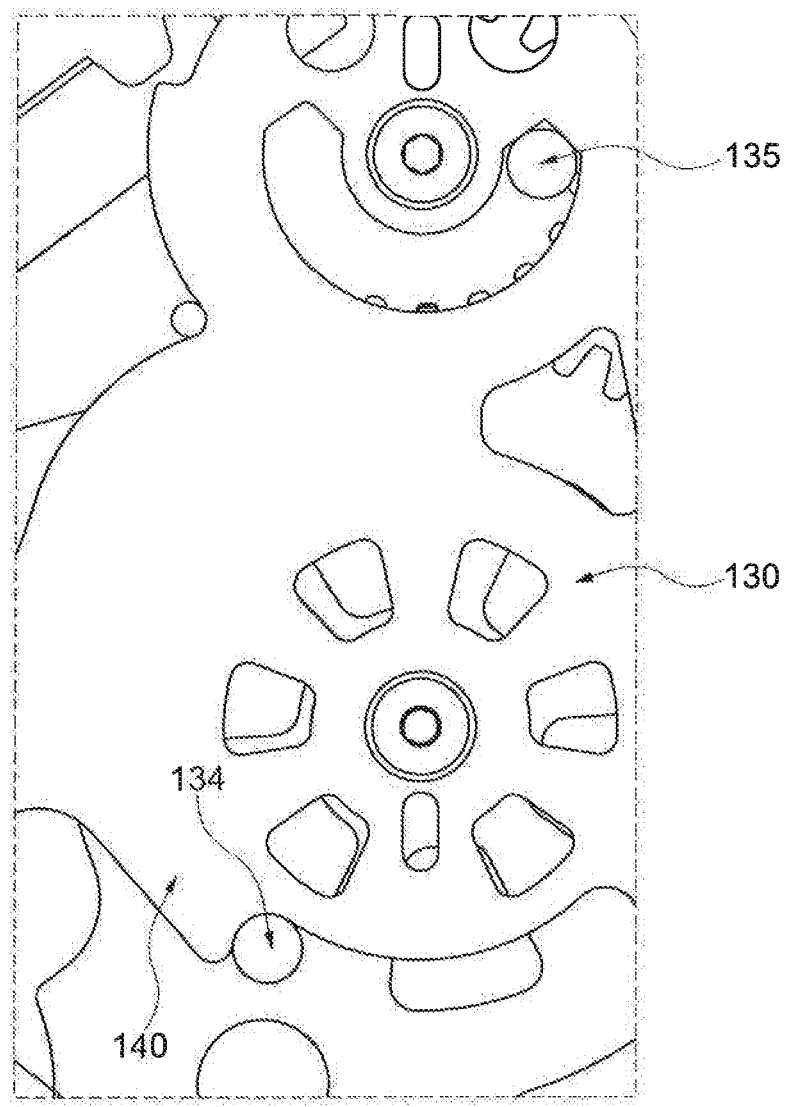
FIG. 11 shows a view of a detail from FIG. 10, wherein this is a view from the other side of the joint.

FIG. 10 shows the engagement of the locking pin 133 on the small base plate 129 once again in the collapsed transport position of the buggy, whereby the pivot movement of the strut 11 of the upper sliding frame is limited (see also FIG. 8 with the arrow illustrated therein for the pivot direction). The engagement of the secondary locking pins 134, 135 with the annular groove 137 or with a further catch 140 of the large base plate 130, respectively, can be seen in FIG. 11, wherein the pivot path of the locking pins 134, 135 as compared to the base plate 130 can be seen by a comparison with the illustration according to FIG. 5.

LIST OF REFERENCE NUMERALS

10 buggy
11 strut of the upper sliding frame
12 joint unit
121 joint cover
122 cover
123 hook for the unlocking
124 toothed wheel part comprising first large toothed wheel
125 toothed wheel part comprising second small toothed wheel
126 second joint cover
127 tie
128 spring
129 first smaller base plate
130 second larger base plate
131 recess
132 locking pin
133 locking pin
134 locking pin
135 locking pin
136 catch
137 annular groove
138 pin
139 nose
140 further catch
13 strut of the lower sliding frame
14 front wheel
15 strut of the rear frame
16 rear wheel

The invention claimed is:

1. A buggy or perambulator comprising an upper sliding frame, a lower sliding frame, to which the front wheels are attached, wherein, in the upright driving position of the buggy, viewed in the side view, upper sliding frame and lower sliding frame are approximately aligned with one another, as well as a rear frame, with rear wheels being attached to said rear frame, said buggy, in the driving position, viewed in the side view, is oriented at an angle to the sliding frames, wherein the buggy can be collapsed about joints from the driving position into a transport position, in which upper sliding frame, lower sliding frame and rear frame are virtually parallel with one another, and wherein joint units are provided, to which the respective end of a strut of the upper sliding frame, which faces said joint units on the one hand, and the respective end of a strut of the rear frame, which faces said joint units on the other hand, are attached so as to be pivotable about joint axes, which are parallel to one another wherein the end of the strut of the upper sliding frame, which faces the joint unit, and the end of the strut of the rear frame, which faces the joint unit, are connected to one another via a first toothed wheel, which rotates about the joint axis of the strut of the upper sliding frame, and a second toothed wheel, which rotates about the axis of the strut of the rear frame, and wherein a first locking pin is located at the first toothed wheel and engages with a catch on a first, smaller base plate, and a second locking pin is located at the second toothed wheel and engages with a catch on a second, larger base plate.

2. The buggy according to claim 1, wherein the first toothed wheel and the second toothed wheel are connected in such a manner that, a pivot movement of the strut of the upper sliding frame in a first direction of rotation results in a pivot movement of the strut of the rear frame in opposite direction of rotation.

3. The buggy according to claim 1, wherein the end of the strut of the lower sliding frame, which faces the joint unit, is fixedly attached to the joint unit.

4. The buggy according to claim 1, wherein provision is made on the joint units for a joint cover, which prevents a jamming of a body part of a user in the space between the struts, which move in the direction of one another, upon collapsing the buggy into the transport position, because the respective ends of the struts are spaced apart from one another on the user side in the joint vicinity.

5. The buggy according to claim 1, wherein provision is made for at least one hook, which, after releasing an engagement with locking elements, makes it possible to unlock the joint units and thus to pivot the struts and to collapse the buggy into the transport position in which the upper sliding frame, lower sliding frame and rear frame are virtually parallel with one another.

6. The buggy according to claim 5, wherein the hook can be disengaged from the locking elements by means of at least one tie against a spring force.

* * * * *